(12) United States Patent
Van Den Berg et al.

(10) Patent No.: US 10,136,616 B2
(45) Date of Patent: Nov. 27, 2018

(54) FEED WAGON

(71) Applicant: LELY PATENT N.V., Maassluis (NL)

(72) Inventors: Karel Van Den Berg, Maassluis (NL); Jan Lambertus Pastoor, Maassluis (NL); Howard Sie, Maassluis (NL); Arie Huyzer, Maassluis (NL); Jan Martinus Van Kuilenburg, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 112 days.

(21) Appl. No.: 15/021,140

(22) PCT Filed: Jul. 31, 2014

(86) PCT No.: PCT/NL2014/050533
§ 371 (c)(1),
(2) Date: Mar. 10, 2016

(87) PCT Pub. No.: WO2015/037983
PCT Pub. Date: Mar. 19, 2015

(65) Prior Publication Data
US 2016/0219831 A1  Aug. 4, 2016

(30) Foreign Application Priority Data
Sep. 10, 2013 (NL) ...................................... 2011413

(51) Int. Cl.
*A01K 5/00* (2006.01)
*G06K 9/00* (2006.01)
(Continued)

(52) U.S. Cl.
CPC ............ *A01K 5/004* (2013.01); *A01D 87/003* (2013.01); *A01F 25/2027* (2013.01);
(Continued)

(58) Field of Classification Search
CPC ...... A01K 5/001; A01K 5/004; A01K 5/0258; A01F 25/2027; G06K 9/00201;
(Continued)

(56) References Cited

U.S. PATENT DOCUMENTS

| | | | | | |
|---|---|---|---|---|---|
| 4,406,338 | A | * | 9/1983 | Dunbar | .................. G01G 19/52 177/145 |
| 5,020,918 | A | * | 6/1991 | Faccia | ..................... A01K 5/004 241/260.1 |
| 5,579,444 | A | * | 11/1996 | Dalziel | .................. B25J 9/1669 382/153 |
| 7,118,268 | B2 | * | 10/2006 | Van Der Plas | ........ A01K 5/004 280/124.11 |

(Continued)

FOREIGN PATENT DOCUMENTS

DE         4131329 A1    3/1993
DE    202008001482 U1    4/2008
(Continued)

*Primary Examiner* — Leslie A Nicholson, III
(74) *Attorney, Agent, or Firm* — Birch, Stewart, Kolasch & Birch, LLP

(57) ABSTRACT

A livestock feed wagon includes a moving frame, a feed container which is fitted on the frame for accommodating animal feed, in particular provided with feed mixer, and a movable arm construction having an operable gripper fitted thereto for grabbing an amount of animal feed. The arm construction is configured in such a way that the arm construction can pivot the gripper only in one plane from a first position for grabbing animal feed next to the livestock feed wagon to a second position for releasing the animal feed above the feed container. This makes it possible to provide a very simple and compact construction.

20 Claims, 2 Drawing Sheets

(51) Int. Cl.
*B25J 11/00* (2006.01)
*A01F 25/20* (2006.01)
*B25J 19/02* (2006.01)
*B25J 15/00* (2006.01)
*A01D 87/00* (2006.01)
*A01K 5/02* (2006.01)

(52) U.S. Cl.
CPC ............ *A01K 5/001* (2013.01); *A01K 5/0258* (2013.01); *B25J 11/0045* (2013.01); *B25J 15/0028* (2013.01); *B25J 19/02* (2013.01); *G06K 9/00201* (2013.01); *G06T 2207/10004* (2013.01); *G06T 2207/30128* (2013.01)

(58) Field of Classification Search
CPC ........... G06T 7/004; G06T 2207/10004; G06T 2207/30128; B25J 11/0045; B25J 15/0028; B25J 19/02
USPC .................. 700/213, 250, 253, 258, 259
See application file for complete search history.

(56) References Cited

U.S. PATENT DOCUMENTS

| | | | |
|---|---|---|---|
| 9,102,055 B1* | 8/2015 | Konolige | B25J 9/163 |
| 9,265,230 B2* | 2/2016 | Van Aalst | E04H 17/02 |
| 9,393,686 B1* | 7/2016 | Bradski | B25J 9/163 |
| 9,522,811 B2* | 12/2016 | Van Kuilenburg | A01K 5/0266 |
| 2010/0326363 A1 | 12/2010 | Van Den Berg | |
| 2013/0245828 A1* | 9/2013 | Tateno | B25J 9/1697 700/259 |
| 2015/0118376 A1* | 4/2015 | Huyzer | A01K 5/004 426/518 |
| 2016/0221187 A1* | 8/2016 | Bradski | B25J 9/163 |

FOREIGN PATENT DOCUMENTS

| | | |
|---|---|---|
| EP | 1563725 A1 | 8/2005 |
| FR | 2874477 A1 | 3/2006 |
| GB | 2018714 A | 10/1979 |

* cited by examiner

FEED WAGON

BACKGROUND OF THE INVENTION

1. Field of the Invention

The invention relates to a livestock feed wagon, comprising a movable frame, a feed container which is fitted on the frame for accommodating animal feed, a movable arm construction having an operable gripper fitted thereto for grabbing an amount of animal feed.

2. Description of Background Art

Such devices are known from the prior art, inter alia from FR2874477. The device described therein comprises a feed-mixing wagon and a movable and rotatable swivelling crane for grabbing animal feed and releasing it into the feed container.

The known device has the drawback that the gripper requires a relatively large amount of working space and energy to operate and its construction is also relatively complicated. Partly in view of the relatively heavy load under which the crane is put during operation, it does not always work sufficiently reliably.

SUMMARY OF THE INVENTION

It is an object of the present invention to improve the known device in such a way that it requires working space and/or energy and/or its construction is simpler and more reliable.

This object is achieved by the invention by means of a livestock feed wagon, in particular a livestock feed wagon, comprising a moving frame, a feed container which is fitted on the frame for accommodating animal feed, in particular provided with feed-mixing means, a movable arm construction having an operable gripper fitted thereto for grabbing an amount of animal feed, wherein the arm construction is configured in such a way that the arm construction can only pivot the gripper in one, substantially vertical plane from a first position for grabbing animal feed next to the livestock feed wagon to a second position for releasing the animal feed above the feed container.

The inventors have realized that freedom of movement in a plane, in which the gripper is thus lifted overhead, is sufficient to carry out the work. Due to the fact that the gripper does not have to pivot and that there is usually unlimited working space in an upward direction, but not in a lateral direction, the working space in the invention, seen in projection, is limited with respect to the known device. After all, no pivoting movement has to be carried out which requires freedom of movement on all sides. In addition, the construction can be kept relatively simple since freedom of movement is only required in that one plane. Partly as a result thereof, the energy consumption of the device can be kept relatively low.

The expression "substantially vertical" in this application is understood to mean that the plane is not horizontal, but vertical, with a deviation of up to approximately 30° being permitted.

Particular embodiments of the invention are described in the dependent claims, as well as in the part which follows.

In particular, the arm construction is connected, by means of a first hinge, to one of either the feed container or the frame, in particular the feed container, and is connected, by means of a second hinge, to the gripper, wherein the arm construction is configured in such a way that the second hinge is pivotable over at least 135° and preferably over at least substantially 180°. Thus, it is ensured that the livestock feed wagon can reliably and efficiently grab animal feed which is situated next to or in front of the livestock feed wagon and that the grabbed animal feed can be dumped into the feed container by being pivoted by the gripper over said angle.

In this case, the arm construction may per se be of various designs, such as a combination of partial arms with additional hinges which are adjustable with respect to each other by means of pressure cylinders or the like. In this case, a more complicated, e.g. multipart, construction will allow for more or more refined movements, but will generally also use more energy during operation and be more susceptible to malfunction and wear.

A single arm part, optionally telescopic, between the first and second hinge is a possibility. More advantageously, the arm construction comprises a rigid arm part between the first and the second hinge. In that case, the rigid arm part is, in particular, a single, undivided arm part which can pivot about the first, "bottom" hinge and in which the gripper can pivot with respect to the rigid arm section at the second, "top" hinge. Incidentally, a multipart but rigidly connected arm construction is also possible. Thus, a very simple and yet functional, efficient arm construction is obtained which has as few parts which move with respect to each other as possible. In this case, the arm construction is able to perform the large pivoting movement due to its advantageous shape and a favourable positioning of one or more actuators.

In embodiments, the arm construction comprises a first arm part and a second arm part, both of which are pivotable about a first hinge pin, as well as a cylinder construction having at least two double-acting pressure cylinders, in which case a first one of the pressure cylinders is configured and fitted to pivot the first arm part with respect to the frame or the feed container, and a second one of the pressure cylinders is configured and fitted to pivot the second arm part with respect to the first arm part. In this case, there is thus a single rigid arm part between the first and the second hinge and there is, in addition, a second arm part which is configured to pivot about the same hinge pin, also with respect to the first arm part, and to move the point of engagement for the second pressure cylinder, as it were, all this in such a manner that it is still possible to achieve the great pivoting movement of approximately or of more than 180° with the pressure cylinder(s). This is an elegant embodiment which can be controlled in a very simple manner and which will be explained in more detail in the description of the figures.

With the livestock feed wagon according to the invention, it suffices if there is only one arm which performs the pivoting movement. In this case, it should be pointed out again that the construction is such that pivoting is only possible in one plane. It is therefore advantageous if the arm construction is fitted on the feed container, as this makes it possible to make the entire arm construction shorter, that is to say smaller and more compact, since no parts are required which ensure rotation of the arm construction about a vertical axis.

In a particular embodiment, the arm construction comprises two arms which are mutually connected by a transverse arm and which are each fitted on one of either the frame or the feed container, in particular to the feed container, more particularly in which the arms are provided on either side of the feed container on one of either the frame or the feed container. In this case, the abovementioned advantage of a more compact and/or simpler arm construction still applies. In addition, the stability and the load-bearing capacity of the arm construction are increased with respect to the arm construction having only one arm. An example of such a construction will be explained in more detail in connection with the drawing and the description thereof. It should be noted that this does not include an arm construction which has two parallel plates in a single arm part. In order to achieve the intended effect of improved stability and/or load-bearing capacity, there has to be some distance between the arms, such as for example identical to the width of the feed container.

In an embodiments, the gripper comprises a gripper-displacement device which is configured to move a gripper at right angles to at least one arm. Thus, it is possible, with said arm construction, to achieve a combination of a large feed container and a small gripper which can then purposefully grab animal feed. Obviously, such a gripper-displacement device is not required if the gripper is of similar dimensions to the feed container, but this will not often be the case in practice. The width of the gripper is advantageously at least X cm smaller than the width of the feed container, viewed in projection at right angles to the forward direction/longitudinal direction of the livestock feed wagon. Preferably, the magnitude of X depends on the type of feed that is to be grabbed. If the animal feed comprises stalky plants, such as grass or hay, then X is for example at least, and in particular substantially rounded-off, 0.6 m. Thus, it is possible, on the one hand, to ensure that the grabbed feed will fall into the feed container with a sufficient degree of reliability and will not miss it. On the other hand, the width of the gripper is at its maximum, which has a beneficial effect on the efficiency and capacity. In the case of other types of feed, in particular chunky or granular or pulverulent types, such as maize, X may be smaller, e.g. 0.2 m.

A further significant advantage is the fact that the gripper can be made to lie outside the feed container in a simple manner, that is to say as far as to the left or right of the forward projection of the feed container. It is thus readily possible, for example, to grab feed which is situated close to a wall or a similar obstacle, without having to manoeuvre the entire livestock feed wagon. It should be noted that the construction of the arm with the gripper will be slightly more complicated, but that the load-bearing capacity still remains greater than in the prior art, in particular in the case of the arm construction having two arms. In this case, the expression "at right angles to at least one arm" is understood to mean that the direction of movement of the gripper-displacement device is at right angles to the plane in which the arm construction can pivot the gripper. In the case of the arm construction with two arms which are connected to each other, the gripper-displacement device will in principle be able to move the gripper across the connection between the two arms.

The gripper-displacement device comprises in particular a crane crab. This is understood to be a movable trolley which can run on a rail, for example by means of wheels, a gearing or a cylinder or the like.

In addition, by means of the gripper-displacement device, the gripper can be positioned in a location which is advantageous for grabbing animal feed without having to manoeuvre the entire livestock feed wagon. This saves a large amount of energy, as the gripper will be much smaller than the entire livestock feed wagon.

The advantage of a low energy consumption which is achieved by the invention is generally seen as an advantage, as there is a general trend to reduce energy consumption in order to preserve natural resources and to save the environment. In a particularly attractive embodiment, the livestock feed wagon according to the invention comprises one or more drive means configured to drive the frame, the arm construction and the gripper, and a control for autonomously controlling the one or more drive means. Thus, an autonomous livestock feed wagon is obtained. In this case, it should be noted that unmentioned energy storage means are also provided and form part of the drive means. The drive means may be a general power source with motor for several parts to be driven, but may also be separate drive means for each separate part to be driven. Examples of the latter are a motor for the frame which, for example, drives the wheels or even separate motors for two or more wheels, as well as separate drive means, such as actuators, for the arm construction and for the gripper. In addition, an optionally provided gripper-displacement device may comprise one or more drive means which are configured to drive the gripper-displacement device. The control may also be suitable to control these drive means. Here, the expression "autonomously controlling" is understood to mean that the livestock feed wagon can operate autonomously. Obviously, it is not ruled out that the livestock feed wagon may, in one or more cases, also receive and process instructions from outside, e.g. from a user.

In particular embodiments, the feed container comprises, along its upper edge and near to the arm construction, a movable wall part with an actuator, which movable wall part is configured to make room for the gripper, that is to say to provide an opening for it in the wall of the feed container. In this case, the movable wall part can be moved out of the way by the actuator in order to allow the gripper to pass. Thus, the arm construction can be made even more compact and the load-bearing capacity can consequently be increased further. It should be noted that, during filling, the feed container is rarely filled to such a level that feed could fall out of the feed container through the opening which is provided by the movable wall part. In particular, the movable wall part is situated between the two arms, on a side on which these are attached to the feed container or the frame. In particular, the actuator moves the movable wall part down and/or aside.

In embodiments, the livestock feed wagon according to the invention comprises a 3D device for recording a spatial image comprising distance information. Advantageously, by means of such a 3D device, the livestock feed wagon is able to, for example, manoeuvre or navigate or also recognise it is approaching an obstacle, such as a post or a human. In particular, the 3D device is an optical 3D device, in particular a 3D camera, such as a TOF camera, a camera on the basis of phase-mixing or a camera on the basis of "structured light". In this case, the term optical comprises both visible light and "in particular near" infrared light. The 3D device may be fitted on the livestock feed wagon at any suitable location, such as on the feed container or on the frame. In particular, the 3D device is fitted on an end of the arm construction which is situated near the gripper or on the gripper. After all, these are moving parts and consequently the livestock feed wagon can still be operated safely even when the wagon stands still with respect to obstacles. Advantageously, the 3D device is positioned in such a manner that its image field extends into or through the area from which the gripper grabs animal feed, in particular, if the gripper comprises two gripping jaw halves, between the open gripping jaw halves.

In particular, the 3D device is configured to carry out an analysis of a surface of a pile of feed which is situated in front of the 3D device and the control controls one or more drive means for driving the frame on the basis of the analysis. In general, a 3D device is able to collect distance information for many points in an image and can thus analyse a surface of an object. The example of a pile of feed which is given here relates to an analysis of the surface thereof in order to manoeuvre the livestock feed wagon with respect to the pile of feed. Advantageously, the control is configured to manoeuvre the livestock feed wagon with respect to the pile of feed, in particular to such a location that the gripper can efficiently grab animal feed.

Alternatively or additionally, with a livestock feed wagon according to the invention which is provided with a gripper-displacement device, the control controls one or more drive means for driving the gripper-displacement device and/or the gripper on the basis of the distance information or the analysis. In this way, the navigation/the manoeuvring of the livestock feed wagon does not necessarily have to take place on the basis of a 3D image. After all, the livestock feed wagon can also be taken to a general location in front of the pile of animal feed, after which the analysis is carried out. On the basis of this analysis, a convenient location may be determined for grabbing animal feed using the gripper. Obviously, such a convenient location is the spot on the pile of animal feed where there is most animal feed, such as the highest location or the location which is situated closest to the front. Obviously, other locations are possible. In this case, the control can control the gripper-displacement device in such a way that the gripper is conveniently located with respect to the desired location.

In principle, the embodiment of the gripper is not particularly limited and may comprise any device which can grab animal feed. Nevertheless, in particular embodiments, the gripper comprises two mutually pivotable gripping jaw halves or a movable blade for cutting a chunk of animal feed from a pile of animal feed. In the latter case, the gripper also comprises, in particular, a movable support for supporting the chunk of animal feed. Such embodiments of the gripper have been found to work well in practice. The first embodiment is particularly suitable for loose bulk material and relatively fresh plants having long stalks, such as grass. The second embodiment has advantages when used with compact types of animal feed, such as silage. Silage often has to be cut using a blade. Alternative embodiments of the gripper for example comprise a bucket or single gripping jaw half, optionally provided with a cutter or the like which is placed above it.

BRIEF DESCRIPTION OF THE DRAWINGS

The invention will now be explained in more detail with reference to the drawing which shows a few non-limiting exemplary embodiments and in which.

DETAILED DESCRIPTION OF THE INVENTION

Figure 1A:
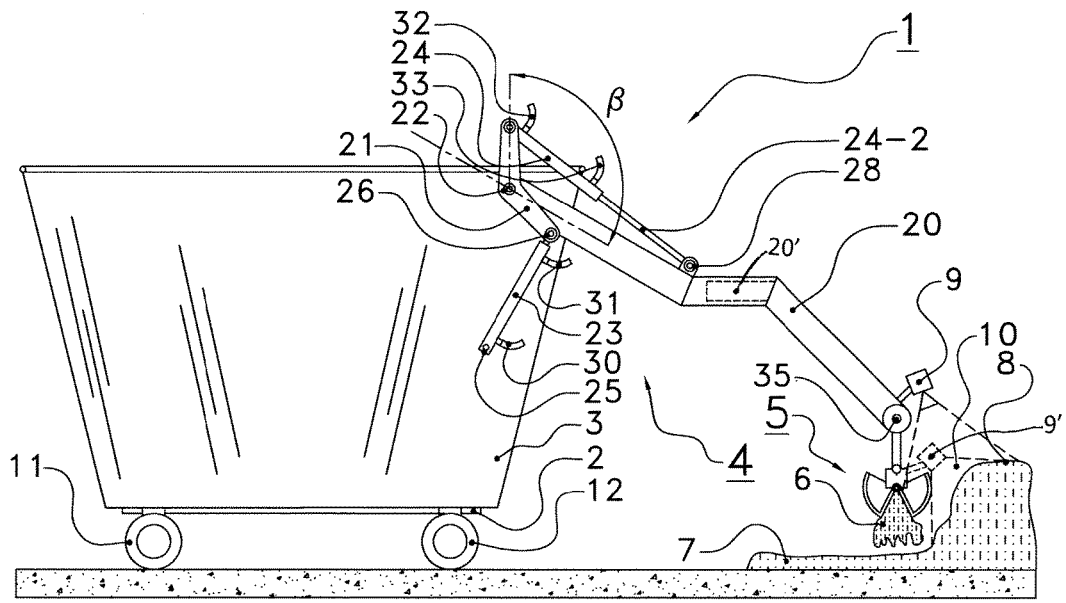
FIGS. 1a and 1b diagrammatically show a side view of an embodiment with two positions for the arm construction.
Figure 1B:
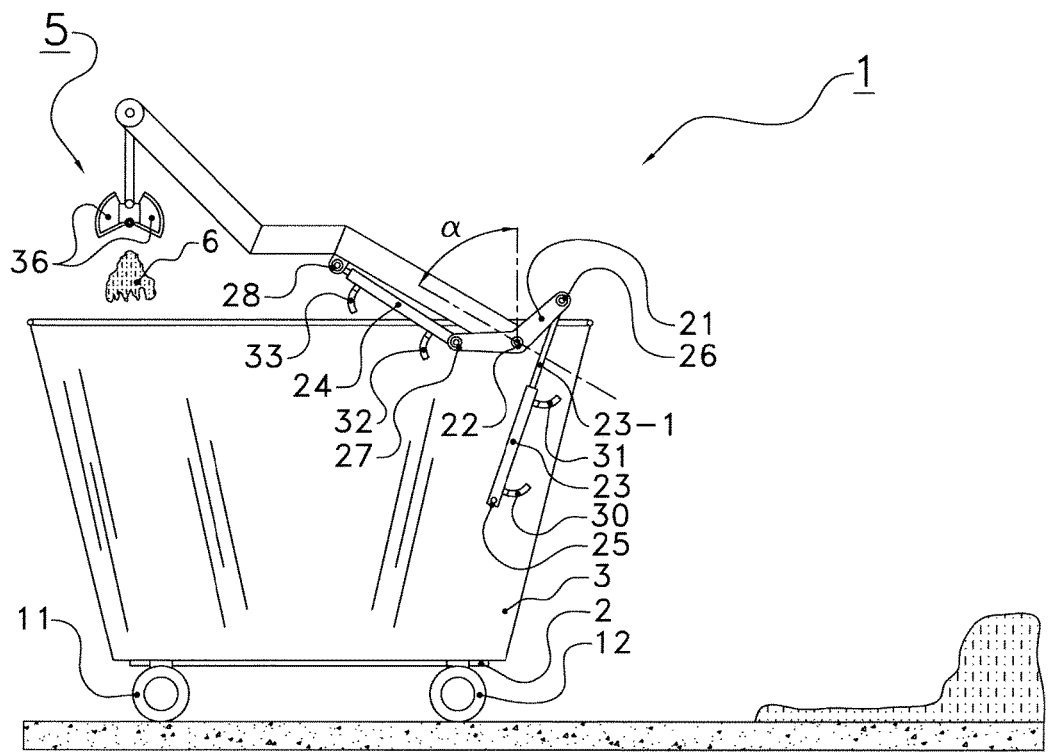

FIGS. 1a and 1b diagrammatically show a side view of an embodiment of the livestock feed wagon according to the invention in two positions.

In these figures, the livestock feed wagon is denoted overall by reference numeral 1 and it comprises a frame 2, a feed container 3, an arm construction 4 and a gripper 5. In FIG. 1a, the gripper 5 takes a chunk of animal feed 6 from the pile of animal feed 7 having a surface 8. Reference numeral 9 denotes a 3D camera with an image field 10 fitted on an end of the arm construction situated near the gripper 5. Reference numeral 9' denotes an alternative embodiment of the 3D camera fitted on the gripper 5 in dotted lines.

The frame 2 comprises rear wheels 11 and a front wheel 12. The arm construction 4 comprises a first arm 20 and a second arm 21, both of which can hinge about a first hinge 22. The arm construction furthermore comprises a first cylinder 23, a second cylinder 24 with respective piston rods 23-1 and 24-1, a first cylinder hinge 25, a second cylinder hinge 26, a third cylinder hinge 27 and a fourth cylinder hinge 28, as well as first to fourth oil connections 30 to 33. Reference numeral 20' denotes an alternative embodiment of the arm being telescopic in dotted lines.

The gripper 5 hinges about a gripper hinge 35 and comprises two gripping jaw halves 36.

In FIG. 1a, the arm construction is moved downwards, with the arm construction 4 making an angle β with the vertical, at least at the first hinge 22. In this position, the 3D camera 9 detects a pile of animal feed 7 in its image field 10. The surface 8 of the pile of animal feed 7 is scanned and analysed in a manner which is known per se. A control (not shown) controls the gripper 5 so it takes a chunk of animal feed 6 from the pile of animal feed 7.

Subsequently, the chunk of animal feed can be taken to the feed container 3 by pivoting the arm construction 4. To this end, oil will initially be pressed into the first cylinder 23 via the first oil connection 30. The hydraulic pressure underneath the piston rod 23-1 which is only visible in FIG. 1b will be lower than that for piston rod 24-1. Therefore, the piston rod 23-1 will extend first, as a result of which the second arm 21, and consequently also the second cylinder 24 and the first arm 20, will start to rotate about the first hinge 22 until the first cylinder 23 is completely extended. If the pressure on the oil or another medium is maintained, this will now cause the second piston rod 24-1 to retract, at a higher pressure. In this case, it is assumed that the respective effective cross sections for the first cylinder 23 is greater than that for the second cylinder 24, such as for example with equal cylinders, since in the case of the second cylinder and contrary to the first cylinder, the cross-sectional area of the piston rod has to be deducted from the piston surface. During retraction of the second piston rod 24-1, the first arm 20 will pivot further with respect to the first hinge 22, for example until an angle α with respect to the vertical is reached, in which α plus β is at least 135°, such as approximately 180°. In the position which is thus reached according to FIG. 1b, the gripper 5 can open the two gripping jaw halves 36, so that the chunk of animal feed 6 which has been grabbed can be dropped into the feed container 3.

In order to take a subsequent chunk of animal feed, the arm construction 4 will have to be moved down again, which may be effected by supplying oil via the third oil connection 32 and then via the second oil connection 31 which will, in this order, first cause the second cylinder 24 to extend and then cause the first cylinder 23 to retract. It should be noted that this arm control is completely hydraulic, but does not require many control electronics. The only requirement is that the correct oil connections are opened. The timing of the movements takes place automatically.

Figure 2:
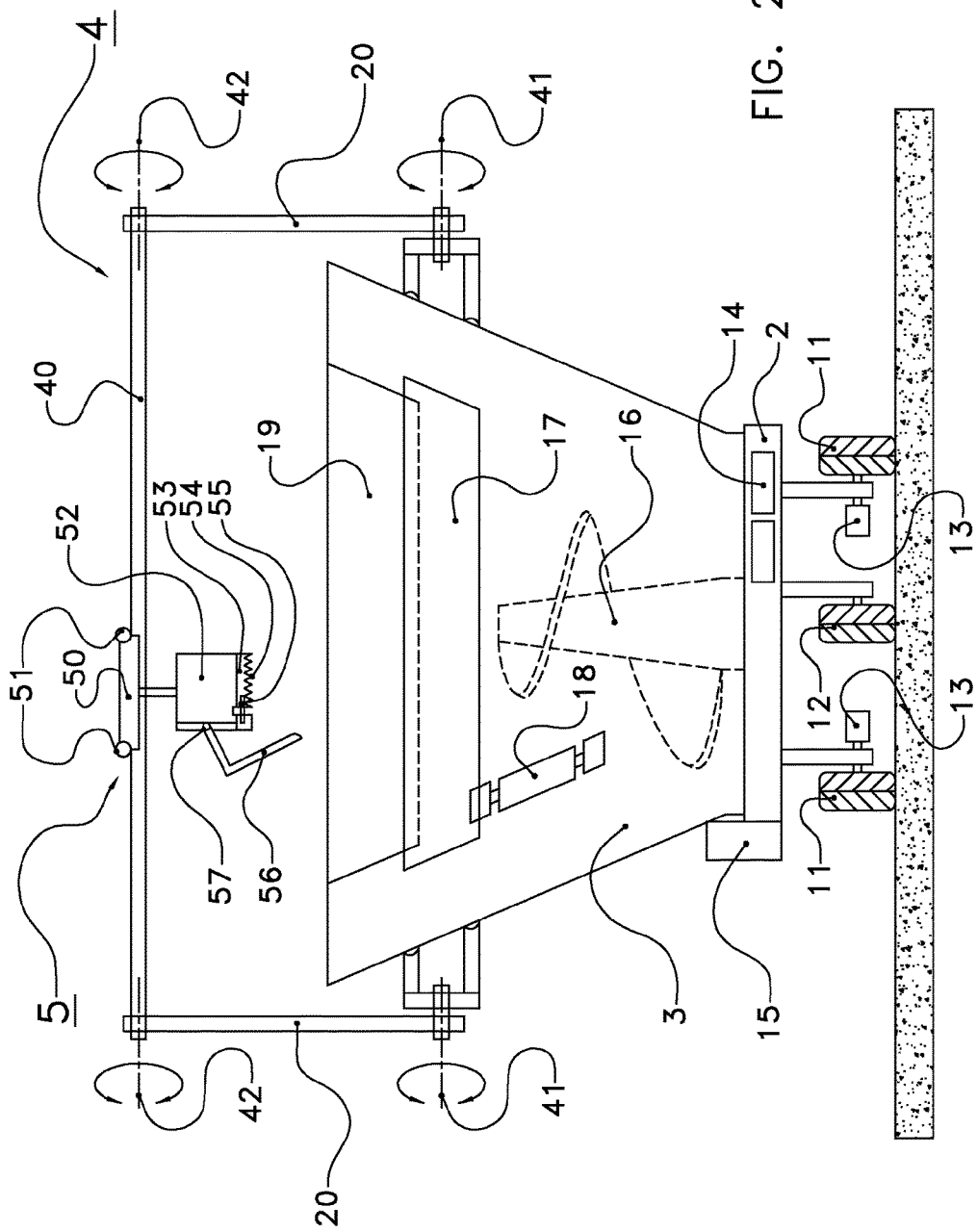
FIG. 2 diagrammatically shows a front view of another embodiment.

FIG. 2 diagrammatically shows a front view of another embodiment of the livestock feed wagon according to the invention. In this figure, identical parts are denoted by the same reference numerals. Furthermore, the frame 2 here comprises electric motors 13 for the rear wheels 11, as well as accumulators 14 and a control 15. Reference numeral 16 denotes a mixing means for the animal feed, reference numeral 17 denotes a movable part of the feed container 3, comprising an actuator 18 and allowing access to an opening 19. Here, the arm construction 4 has a double configuration and comprises two first arms 20 and a transverse arm 40 which can pivot about a first pivot line 41 and a second pivot line 42. The gripper 5 here comprises a crane crab 50 with running wheels 51, as well as a gripping jaw 52 having a blade 53 with teeth 54 and a blade actuator 55, as well as a support 56 which can hinge about a hinge 57. In the embodiment illustrated here, it will be clear that the arm construction can only pivot in a plane at right angles to the pivot axis 41.

The movable part 17 which can be moved downwards by means of an actuator 18, such as a cylinder or the like, and in doing so allows access to an opening 19, offers the advantage that the gripper 5 has to swing out less far. In order words, the first arm 20 can be made shorter, or more generally, the arm construction 4 can be made more compact.

In this case, the mixing means 16 are shown as a vertical auger. Other mixing means, such as horizontal augers or the like which are known from the prior art, are also possible. For the sake of clarity, other features which are customary for feed-mixing wagons, such as unloading openings and the like, have not been shown here, but can be selected by the person skilled in the art from the examples known from the prior art.

The livestock feed wagon illustrated here is autonomous. That is to say that it can move and can carry out one or more tasks autonomously. To this end, the control 15 is configured in an efficient manner. In addition, there is a power source on board in the form of accumulators 14. These provide, for example, the energy which is required for the electric motors 13 to drive the rear wheels 11. The front wheel 12 is shown here as a swivelling wheel, but may also be steerable and/or may also be provided with an electric motor for driving. The illustrated number of wheels, in this case three, is also not particularly limited and may comprise any suitable number. Other parts, such as a navigation system such as GPS, radio beacon or inductive strip follower, are also provided but have not been shown for the sake of clarity as they do not form part of the actual invention.

The gripper 5 here comprises a gripper-displacement device which is generally denoted by reference numeral 50, here a crane crab with running wheels 51. Other embodiments, such as having a chain drive, a cable, hydraulic or pneumatic, are also possible.

The gripper illustrated here has a gripping jaw 52 which is configured here as a metal shell which is open at the bottom, underneath which a movable blade 53 having downwardly directed teeth 54 is provided. The blade can be moved, for example along the metal shell, by means of blade actuator 55, and can thus perform, for example, a substantially circular cutting movement on silage or the like. In this case, the gripping jaw 52 may be slightly lowered during cutting by means of gripping jaw lifting means (not shown) or the like. Once a desired amount of animal feed has been cut, the support 56, which is configured here as hinging about hinge 57, is pushed under the chunk of animal feed to be carried along, following which the chunk can be taken out of the pile of animal feed. Obviously, other forms of gripper are possible, such as the one shown in FIGS. 1*a* and 1*b*. The gripping jaw illustrated here is narrower than the crane crab.

The grabbing accuracy which can be achieved is high. However, if the crane crab 50 is made narrower than is the case here, for example by placing the running wheels 51 closer together, it becomes simpler to move the gripping jaw beyond the projection of the feed container 3 at right angles to the forward direction (in this case in the plane of the drawing). As a result thereof, it is also possible to accurately and efficiently grab, for example along the wall of a feed bunker or the like. Such a lateral gripper movement is a good alternative to an arm construction which is rotatable and adjustable in many directions.

The illustrative embodiments shown here are intended to be non-limiting. Rather, the scope of protection of the present invention is determined by the attached claims.

The invention claimed is:

1. A livestock feed wagon, comprising:
   a movable frame;
   a feed container fitted on the frame for accommodating animal feed; and
   a movable arm construction having an operable gripper fitted thereto for grabbing an amount of animal feed,
   wherein the arm construction is configured in such a way that the arm construction can only pivot the gripper in one, substantially vertical, plane from a first position for grabbing animal feed next to the livestock feed wagon to a second position for releasing the animal feed above the feed container,
   wherein the gripper comprises a gripper-displacement device configured to move the gripper at right angles to at least one arm of the arm construction, and
   wherein the gripper-displacement device comprises a movable trolley which can run on a rail.

2. The livestock feed wagon according to claim 1, wherein the arm construction is connected, by means of a first hinge, to one of either the feed container or the frame, and is connected, by means of a second hinge, to the gripper, and wherein the arm construction is configured in such a way that the second hinge is pivotable over at least 135° with respect to the first hinge.

3. The livestock feed wagon according to claim 2, wherein the arm construction comprises a single, rigid or telescopic, arm part between the first hinge and the second hinge.

4. The livestock feed wagon according to claim 2, wherein the arm construction comprises a single, rigid or telescopic, arm part between the first and the second hinge.

5. The livestock feed wagon according to claim 1, wherein the arm construction comprises two arms mutually connected by a transverse arm, each of the two arms being fitted on one of either the frame or the feed container.

6. The livestock feed wagon according to claim 5, wherein the feed container, along an upper edge thereof and between the two arms, comprises a movable wall part with an actuator, which movable wall part is configured to make room for the gripper to move downwards and/or sideways.

7. The livestock feed wagon according to claim 1, further comprising:
   one or more drives configured to drive the frame, the arm construction and the gripper; and
   a control for autonomously controlling the one or more drives.

8. The livestock feed wagon according to claim 1, wherein the feed container, along an upper edge thereof and near to the arm construction, comprises a movable wall part with an actuator, which movable wall part is configured to make room for the gripper.

9. The livestock feed wagon according to claim 1, further comprising a 3D device for recording a spatial image comprising distance information.

10. The livestock feed wagon according to claim 9, wherein the 3D device is configured to perform an analysis of a surface of a pile of feed situated in front of the 3D device, and wherein the control controls one or more drives configured to drive the frame on the basis of the analysis.

11. The livestock feed wagon according to claim 9, wherein the gripper comprises a gripper-displacement device configured to move a gripper at right angles to at least one arm, and wherein a control controls one or more drives configured to drive the gripper-displacement device and/or the gripper on the basis of the distance information of the analysis.

12. The livestock feed wagon according to claim 1, wherein the gripper comprises two mutually pivotable gripping jaws or a movable blade for cutting a chunk of animal feed from a pile of animal feed.

13. The livestock feed wagon according to claim 1, wherein the feed container is provided with a feed mixer.

14. The livestock feed wagon according to claim 1, wherein the arm construction is connected, by means of a first hinge to the feed container, and is connected, by means of a second hinge, to the gripper, and wherein the arm construction is configured in such a way that the second hinge is pivotable over at least 135° with respect to the first hinge.

15. The livestock feed wagon according to claim 1, wherein the arm construction comprises two arms mutually connected by a transverse arm, each of the two arms being fitted on either side of the feed container.

16. The livestock feed wagon according to claim 15, wherein the feed container, along an upper edge thereof and between the two arms, comprises a movable wall part with an actuator, which movable wall part is configured to make room for the gripper to move downwards and/or sideways.

17. The livestock feed wagon according to claim 1, wherein the movable trolley comprises a crane crab.

18. The livestock feed wagon according to claim 1, further comprising:
   one or more drives configured to drive the frame, the arm construction and the gripper-displacement device; and
   a control for autonomously controlling the one or more drives.

19. The livestock feed wagon according to claim 1, further comprising an optical 3D device for recording a spatial image comprising distance information, the optical 3D device being fitted on an end of the arm construction, which is situated near the gripper or on the gripper.

20. The livestock feed wagon according to claim 1, wherein the gripper comprises two mutually pivotable gripping jaws or a movable blade for cutting a chunk of animal feed from a pile of animal feed, and also a movable support for supporting the chunk of animal feed.

* * * * *